United States Patent [19]

Kawamura et al.

[11] Patent Number: 5,106,267
[45] Date of Patent: Apr. 21, 1992

[54] OUTLET PRESSURE CONTROL SYSTEM FOR ELECTROMAGNETIC RECIPROCATING PUMP

[75] Inventors: Akira Kawamura, Shizuoka; Teshio Osada, Tokyo, both of Japan

[73] Assignee: Nitto Kohki Co., Ltd., Tokyo, Japan

[21] Appl. No.: 514,667

[22] Filed: Apr. 25, 1990

[30] Foreign Application Priority Data

May 16, 1989 [JP] Japan .................................. 1-55949[U]

[51] Int. Cl.[5] ............................................. F04B 49/08
[52] U.S. Cl. ........................................ 417/45; 417/417
[58] Field of Search ............................ 417/44, 417, 45

[56] References Cited

U.S. PATENT DOCUMENTS

| | | | |
|---|---|---|---|
| 3,542,495 | 11/1970 | Barthalon | 417/416 |
| 3,966,358 | 6/1976 | Heimes et al. | 417/44 |
| 4,353,220 | 10/1982 | Curwen et al. | 417/418 |
| 4,454,456 | 6/1984 | Hauser | 417/417 |
| 4,575,313 | 3/1986 | Rao et al. | 417/26 |
| 4,692,673 | 9/1987 | DeLong | 417/417 |
| 4,706,470 | 11/1987 | Akazawa et al. | 62/209 |
| 4,787,823 | 11/1988 | Hultman | 417/45 |
| 4,884,954 | 12/1989 | Van Niekerk | 318/135 |
| 4,965,864 | 10/1990 | Roth et al. | 318/135 |

Primary Examiner—Richard A. Bertsch
Assistant Examiner—David W. Scheuermann
Attorney, Agent, or Firm—Kinney & Lange

[57] ABSTRACT

An electromagnetic reciprocating pump comprises a pressure sensor for detecting the actual outlet pressure of the electromagnetic reciprocating pump, and the strokes of the electromagnetic drive means and the compressor piston connected to the electromagnetic drive means varies are feedback controlled by the deviation from the present outlet pressure of the actual outlet pressure detected by the pressure sensor. The stroke of the electromagnetic drive means is controlled by adjusting the average magnitude of the half-wave AC current supplied to the electromagnetic drive means.

4 Claims, 2 Drawing Sheets

OUTLET PRESSURE CONTROL SYSTEM FOR ELECTROMAGNETIC RECIPROCATING PUMP

BACKGROUND OF THE INVENTION

1. Field of the Invention

The present invention relates to a pressure control system for an electromagnetic reciprocating pump, and particularly to a pressure control system for an electromagnetic reciprocating pump which can maintain the actual outlet pressure at a predetermined value. 2. Description of the Prior Art Various proposals have so far been made to the structure of a compressor equipment. But, it is general to convert a rotating drive source to the linear reciprocating motion of a compressor piston through a crank mechanism, or to generate a pressurized fluid by connecting a rotating drive source to a rotation-type fluid compressing device. The former is accompanied by a large noise and vibration, and the overall structure becomes complex. The latter is excellent in noise and vibration, but the sealing is very difficult in the rotation-type fluid compressing device.

Also, outlet pressure control for these compressor equipments is typically on-off control, and it is difficult to perform an accurate pressure control with high precision.

In contrast to this, in an electromagnetic reciprocating pump using an electromagnetic drive means as the drive source, since the electromagnetic drive means itself performs a linear motion, a mechanism for converting a rotary motion to a linear motion or an advanced sealing technique such as needed in the rotation-type fluid compressing device is not required, so it has advantages such as simplification of the structure of the whole equipment and a smooth fluid compressing motion.

In addition, different from the compressor equipments of other types as described above, it is extremely easy to vary the piston stroke in the electromagnetic reciprocating pump. That is, the piston stroke of the electromagnetic reciprocating pump directly connected to the electromagnetic drive means can be varied with a relation of 1:1 by controlling the amplitude and/or frequency of the AC current to be supplied to the excitation winding of the electromagnetic drive means to vary its motion stroke. This is another advantage of the electromagnetic reciprocating pump.

Electromagnetic drive means suitable for the electromagnetic reciprocating pump is described in Maurice Barthalon's U.S. Pat. No. 3,542,495, for instance.

As described above, the electromagnetic reciprocating pump has many advantages as compared with other type compressor equipments, but no proposal was made in the past to the pressure control of its discharge fluid.

SUMMARY OF THE INVENTION

It is an object of the present invention to provide a pressure control system for an electromagnetic reciprocating pump which maintains the outlet pressure at a preset value.

The characteristic feature of the present invention resides in that a pressure sensor for detecting the actual outlet pressure of the electromagnetic reciprocating pump, and the stroke of the electromagnetic drive means are feedback controlled by using the deviation from the preset outlet pressure of the actual outlet pressure detected by the pressure sensor. According to the control of the reciprocating stroke of the electromagnetic drive means, the stroke of the compressor piston connected to the electromagnetic drive means varies, whereby the outlet pressure of the electromagnetic reciprocating pump is controlled.

Also, the characteristic feature resides in that the control of the distance or stroke of the reciprocating motion of the electromagnetic drive means is done by adjusting the average magnitude of the half-wave AC current supplied to the electromagnetic drive means. With this, the control of the stroke of the reciprocating motion of the electromagnetic drive means can be carried out with a relatively simple construction. The control of the average magnitude of the AC current is easily realized by modulating the firing angle and/or the amplitude of the half-wave AC current.

DETAILED DESCRIPTION OF THE PREFERRED EMBODIMENT

Figure 1:
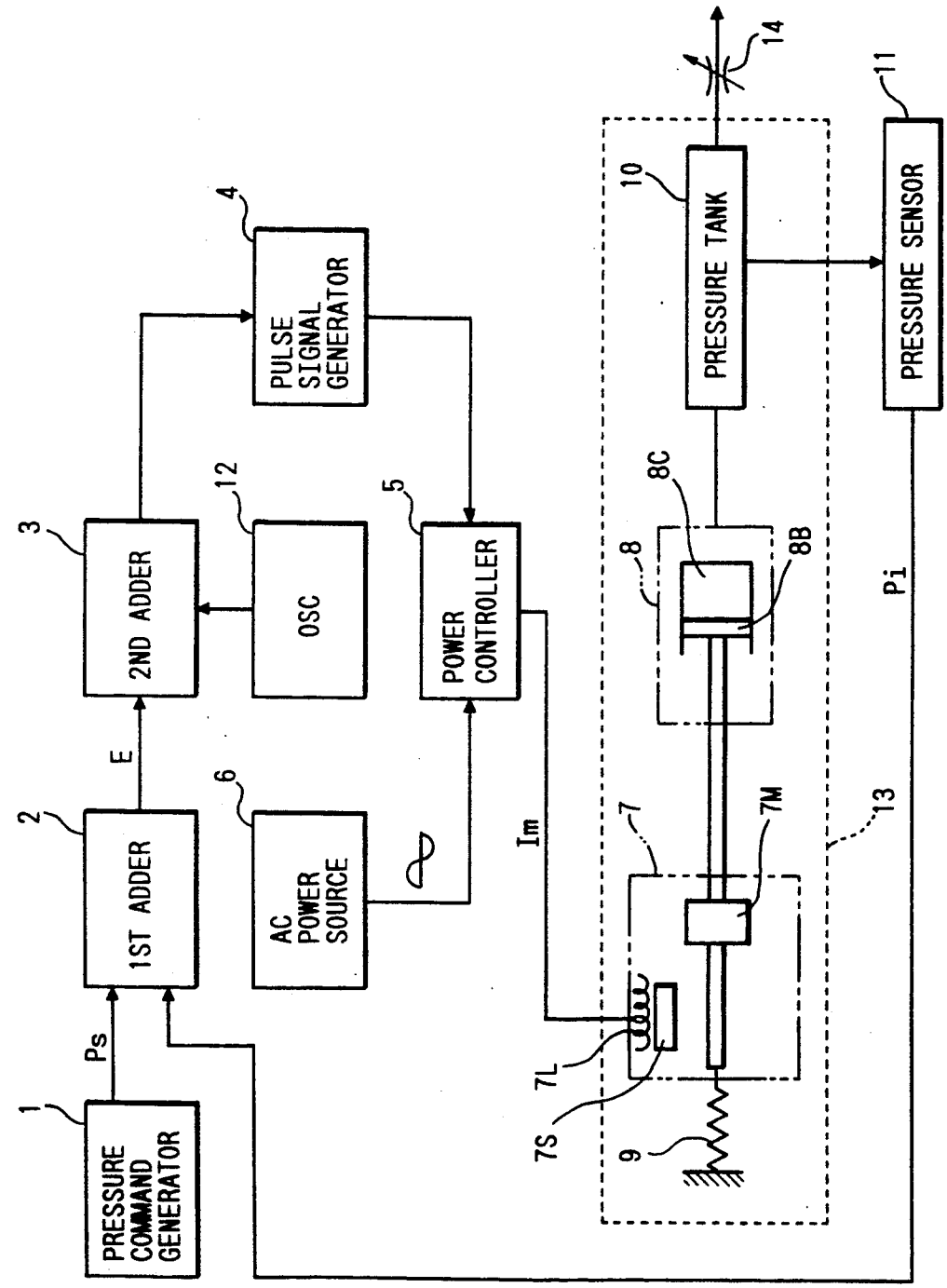
FIG. 1 is a block diagram of an embodiment of the present invention.

The present invention is described in detail with reference to FIG. 1, which shows a block diagram of an embodiment of the present invention.

In the same figure, a pressure demand generator 1 specifies the pressure of the fluid to be discharged from an electromagnetic reciprocating pump 13. A first adder 2 adds a pressure command signal Ps output from the pressure command generator 1 and a fluid pressure signal Pi output from a pressure sensor 11, a second adder 3 is a kind of the phase controller which adds a sum signal output from the first adder 2, namely an error signal E, and a signal of a predetermined frequency output from a frequency signal generator 12, thereby to vary the phase of the signal of the predetermined frequency signal according to the error signal E. Hereinafter, a phase controlled frequency signal is called a synchronizing signal.

A pulse signal generator 4 generates a pulse in synchronism with the synchronizing signal. A power controller 5 comprising a controlled rectifier such as thyristor receives the AC voltage signal output from an AC power supply 6 and fires the controlled rectifier in response to the pulse signal output from the pulse signal generator 4 to supply an operation power to an electromagnetic drive means 7. That is, the output of the power controller 5 is an AC voltage the firing angle of which is controlled according to the error signal E, in other words, a phase controlled AC voltage. The AC output of the power controller 5 is described later with reference to FIG. 2.

The electromagnetic drive means 7 may be the one similar to that described in the above-mentioned USP. specification.

The phase controlled AC voltage output from the power controller 5 is applied to an excitation winding 7L wound around the stator core 7S of the electromagnetic drive means 7. An excitation current Im corresponding to the applied voltage and the firing angle flows in the excitation winding 7L, and a magnetic flux Φ corresponding to the excitation current Im is induced in the stator core 7S. That is, the magnetic flux Φ occurring in the stator core 7S of the electromagnetic drive means 7 varies according to the effective output current of the power controller 5. A moving core 7M is attracted to the stator core 7S by the magnetic flux Φ and moves in the direction thereof. Whereupon, the piston 8B of a compressor 8 connected to the moving core 7M of the electromagnetic drive means 7 also moves by the travel distance of the moving core 7M. The movable portion of the electromagnetic drive means 7 including the piston 8B moves in the direction of compressing a return spring 9, to a position where the electromagnetic attraction force Fm acting between the stator core 7S and the moving core 7M and the restoring force Fs of the spring 9 are balanced. At this time, the compressor 8 sucks the fluid into its fluid chamber 8C through an appropriate inlet valve (not shown).

Since the AC voltage supplied to the power controller 5 reverses between a positive and a negative states for each half cycle, the controlled rectifier element such as thyristor of the power controller 5 stops its operation when the polarity of the voltage applied to its anode changes from positive to negative. That is, a half-wave AC current is supplied to the electromagnetic drive means 7. Since the electromagnetic force Fm acting between the stator core 7S and the moving core 7M of the electromagnetic drive means 7 disappears during the negative half waves of the AC current, the movable portion of the electromagnetic drive means 7 is subjected to only the restoring force of the return spring 9. The movable portion of the electromagnetic drive means 7 is, therefor, caused to return to the static position by the restoring force Fs of the return spring 9 when the output voltage of the power controller 5 is 0. At this time, the fluid sucked by the compressor 8 when the moving core 7M of the electromagnetic drive means 7 was attracted toward the stator core 7S is compressively sent to a pressure tank 10 through an outlet valve (not shown).

The pressurized fluid is accumulated in the pressure tank 10 by the reciprocating motion of the movable portion of the electromagnetic drive means 7 mentioned above.

The fluid under a predetermined pressure which is stored in the pressure tank 10 is taken out to the exterior through a discharge quantity regulator means 14.

The pressure sensor 11 is provided in the pressure tank 10. The pressure sensor 11 detects the fluid pressure in the pressure tank 10 and outputs an electric signal (fluid pressure signal Pi) proportional to the pressure of the fluid. The fluid pressure signal Pi is sent to the first adder 2, where it is added to the pressure command signal Ps and the sum signal is output as the error (deviation) signal E. In this embodiment, it is predetermined that the pressure command signal Ps assumes a positive value and the fluid pressure signal Pi a negative value.

Figure 2:
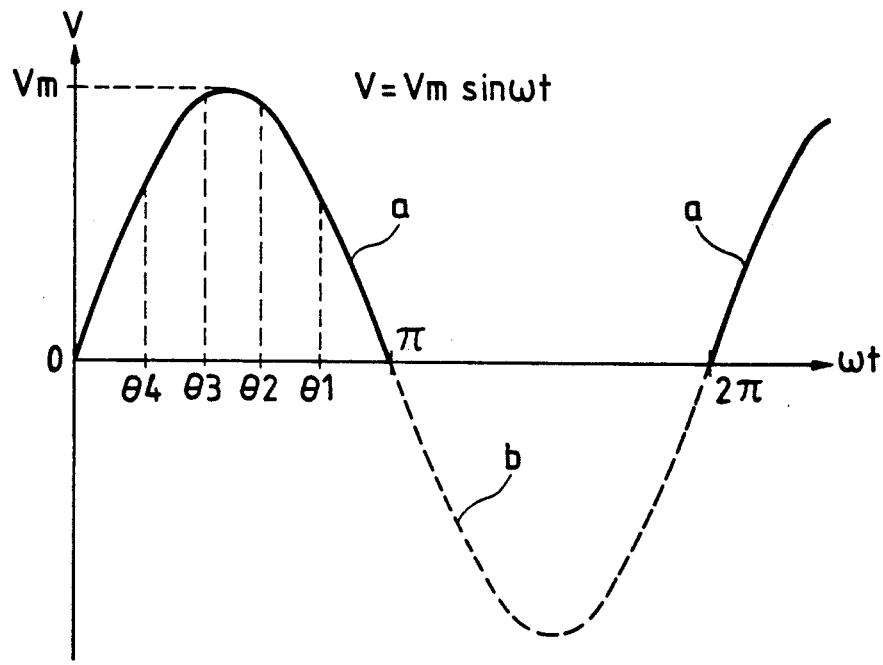
FIG. 2 is a voltage waveform provided by a power controller.

FIG. 2 is a waveform diagram of the voltage output from the power controller. The output voltage V of the power controller 5 is the solid line portion of $Vm \sin \omega t$ which is shown by a symbol "a", and the dashed line portion shown by a symbol "b" is the portion where the output thereof is prohibited by the power controller 5.

The output pulse of the pulse signal generator 4 is generated in synchronism with the synchronizing signal which is controlled in phase according to the error signal E, as described above. And in the power controller 5, the firing angle of the controlled rectifier is controlled according to the synchronizing signal. For instance, if the error signal is E4, E3, E2, E1 or 0 (E4 > E3 > E2 > E1 > 0), the firing angle is $\theta 4, \theta 3, \theta 2, \theta 1$ or $\pi$, respectively. As can be seen from FIG. 2, the voltage output period of the power controller 5 is from $\theta 4$ to $\pi$, from $\theta 3$ to $\pi$, from $\theta 2$ to $\pi$, from $\theta 1$ to $\pi$, or null, during the period of one cycle of the voltage waveform, when the error signal is E4, E3, E2, E1 or 0, respectively. When the error signal becomes negative, the power controller 5 generates no output.

Now assuming that the inductance and the resistance of the excitation winding 7L of the electromagnetic drive means 7 are L and R, and the current flowing in the excitation winding is Im, then the following equation (1) is formulated.

$$L(dIm/dt) + R \times Im = V \qquad (1)$$
(where $\theta m \leq \omega t \leq \pi$)

As described above, when the error signal E varies, the phase of the synchronizing signal varies to change the firing angle $\theta$ and the voltage output period of the power controller 5. By these change, the current Im in the excitation winding 7L changes. That is, the electromagnetic force Fm acting on the movable portion of the electromagnetic drive means 7 varies according to the error signal E, which causes the stroke of the movable portion of the electromagnetic drive means 7, whereby in turn the quantity of the fluid compressively sent to the pressure tank 10 changes. In other words, the quantity of the fluid compressively sent by the compressor 8 to the pressure tank 10 is feedback controlled according to the fluid pressure signal Pi which is output from the pressure sensor 11.

Assumed that the spring constant of the return spring 9 compressed by the movable portion of the electromagnetic drive means 7 is k and the compression amount of the return spring 9 is x, the restoring force Fs produced by the compression of the return spring 9 is expressed by the following equation (2).

$$Fs = kx \qquad (2)$$

When the restoring force Fs equals the electromagnetic attraction force Fm, the movable portion of the electromagnetic drive means 7 stops. Since the compression amount x of the return spring 9 at that time is the stroke of the piston 8B of the compressor 8, the product Sx of the compression amount x by the piston's cross section S is the entrapment volume U of the fluid.

When the current Im in the excitation winding goes to 0, the return spring 9 pushes back the movable portion of the electromagnetic drive means 7 and the piston 8B of the compressor 8 to pressurize the fluid sucked into the compressor 8 and feed out the fluid to the pressure tank 10.

It has been described above that the stroke of the electromagnetic drive means 7 is varied by the phase-control of the voltage which is supplied to the electromagnetic drive means 7 by the power controller 5, according to the error signal E, thereby to control the quantity of the fluid compressively sent from the compressor 8 to the pressure tank 10. The present invention, however, is not particularly limited only to that, and it may be permitted that, by controlling the amplitude Vm of the voltage output from the power controller 5 according to the error signal E to vary the stroke of the movable portion of the electromagnetic drive means 7 so that the error signal E becomes 0, thereby for controlling the quantity of the fluid compressively fed to the pressure tank 10 by the compressor 8.

Figure 3:
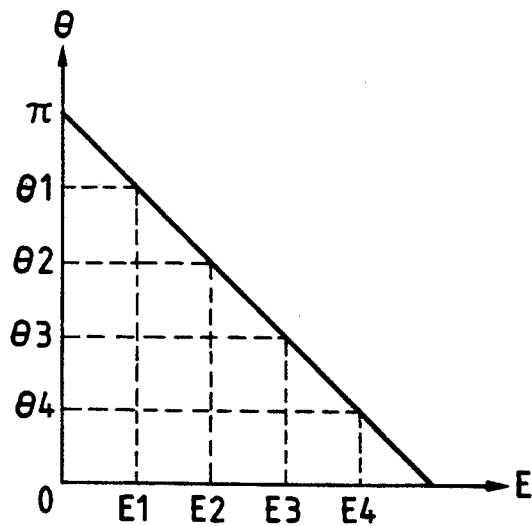
FIG. 3 is a graph showing the relationship between the error signal which is output from the first adder and the firing angle of the half-wave AC current.

In FIG. 3, the relationship of the error signal E and the firing angle $\theta$ is set as a linear function wherein the angle $\theta$ becomes $\pi$ when the error signal E is 0, but, if the electromagnetic drive means 7 has a dead band, it may be set such that the angle $\theta$ assumes the upper limit value (a value smaller than $\pi$) of the dead band when the error signal E is 0.

Further, although it has been described that the firing angle $\theta$ is varied according to the error signal E as shown in FIG. 3, it may be allowed that the firing angle $\theta$ is set to a predetermined fixed value only when the error signal E is positive, and that $\theta$ is set to $\pi$ when E is 0 or negative.

As apparent from the above description, the following technical advantages are accomplished by the present invention.

(1) By feedback controlling the stroke of the electromagnetic drive means on the basis of the error signal which is a function of the actual outlet pressure and the preset outlet pressure of an electromagnetic reciprocating pump so that the error signal nears 0, thereby to regulate the stroke of the compressor connected to the electromagnetic drive means, the actual outlet pressure of the electromagnetic reciprocating pump is always maintained at the preset outlet pressure.

(2) Since the stroke control of the movable portion of the electromagnetic drive means is performed by adjusting the firing angle or the amplitude of the halfwave AC current supplied to the electromagnetic drive means thereby to control its excitation winding current, the stroke control of the movable portion of the electromagnetic drive means can accurately be executed with a relatively simple arrangement.

What is claimed is:

1. An outlet pressure control system for an electromagnetic reciprocating pump comprised of a electromagnetic drive means and a compressor driven by the electromagnetic drive means comprising
    a pressure command generator for setting an outlet pressure, a pressure sensor for sensing the actual outlet pressure of the compressor, and control means responsive to an error signal which is a function of the output signals of the pressure command generator and the pressure sensor, for controlling the stroke of the electromagnetic drive means so that the error signal nears zero.

2. An outlet pressure control system for an electromagnetic reciprocating pump of claim 1 wherein the electromagnetic drive means includes a stator core, an excitation winding for magnetically exciting the stator core, and a moving core mechanically connected to a piston of the compressor, and the control means controls the average magnitude of the AC current supplied to the excitation winding.

3. An outlet pressure control system for an electromagnetic reciprocating pump of claim 2 wherein the control means controls the firing angle of the AC voltage supplied to the excitation winding.

4. An outlet pressure control system for an electromagnetic reciprocating pump of claim 2 wherein the control means controls the amplitude of the AC voltage supplied to the excitation winding.

* * * * *